US012638007B2

(12) United States Patent
Albisu Iso et al.

(10) Patent No.: US 12,638,007 B2
(45) Date of Patent: May 26, 2026

(54) METHODS FOR LUBRICATING A PITCH BEARING OF A WIND TURBINE

(71) Applicant: General Electric Renovables España S.L., Barcelona (ES)

(72) Inventors: Efren Albisu Iso, Barcelona (ES); Pedro Arroyo Beltri, Barcelona (ES); Louis Bond-Smith, Barcelona (ES)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/905,222

(22) Filed: Oct. 3, 2024

(65) Prior Publication Data

US 2025/0109737 A1 Apr. 3, 2025

(30) Foreign Application Priority Data

Oct. 3, 2023 (EP) .................................... 23383016

(51) Int. Cl.
 F03D 80/70 (2016.01)
 F03D 7/02 (2006.01)
(52) U.S. Cl.
 CPC ......... F03D 80/709 (2023.08); F03D 7/0224 (2013.01); F03D 80/701 (2023.08); F05B 2260/98 (2013.01)
(58) Field of Classification Search
 None
 See application file for complete search history.

(56) References Cited

U.S. PATENT DOCUMENTS

| 9,523,282 | B2 * | 12/2016 | Wenclik | .................. F03D 7/026 |
| 11,946,450 | B2 * | 4/2024 | Elmose | .................. F03D 17/00 |
| 2012/0041609 | A1 | 2/2012 | Xin et al. | |
| 2014/0248118 | A1 * | 9/2014 | Wenclik | ............... F03D 7/0224 |
| | | | | 415/13 |
| 2021/0164440 | A1 * | 6/2021 | Elmose | ..................... F03D 7/04 |

FOREIGN PATENT DOCUMENTS

| CN | 112832962 A | 5/2021 | |
| WO | WO2008/065088 A2 | 6/2008 | |
| WO | WO-2023232620 A1 * | 12/2023 | .............. F16C 19/22 |

OTHER PUBLICATIONS

European Search Report Corresponding to EP23383016 dated Mar. 13, 2024.

* cited by examiner

*Primary Examiner* — Juan G Flores
(74) *Attorney, Agent, or Firm* — Dority & Manning, P.A.

(57) ABSTRACT

Methods for lubricating a pitch bearing connecting a blade and a hub of a wind turbine include determining that lubricating the pitch bearing is to be carried out. The method further includes determining a top limit for a thrust gradient, the thrust gradient being a derivative of thrust with respect to time. Further, the method includes determining a pitch rate for lubricating the pitch bearing based at least partially on the top limit for the thrust gradient, and pitching the wind turbine blade at the determined pitch rate for lubricating the pitch bearing such that the top limit for the thrust gradient is not exceeded.

20 Claims, 4 Drawing Sheets

100

METHODS FOR LUBRICATING A PITCH BEARING OF A WIND TURBINE

The present disclosure relates to methods for lubricating a pitch bearing of a wind turbine. The present disclosure further relates to wind turbine controllers and to wind turbines configured to carry out such methods.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

Wind turbine blades are generally coupled to the hub by a pitch bearing. A pitch bearing typically comprises an inner ring and an outer ring, and usually a plurality of rolling or roller elements between the inner and outer ring. A wind turbine blade may be attached either to the inner ring or to the outer ring, whereas the hub may be attached to the other of the inner ring and outer ring. The attachment may for example be performed with nuts and bolts.

When a pitch bearing ring is rotated with respect to the other bearing ring, e.g. with an electric or hydraulic pitch actuator, the blade may rotate with respect to the hub around its longitudinal axis. For example, a blade attached to the bearing inner ring may rotate with respect to the hub. Causing a wind turbine blade to rotate in this way may generally be referred to as "pitching" the blade. In (electro) mechanical pitch systems, a pinion may mesh with an annular gear typically provided on the bearing ring to which the blade is joined to in order to set the wind turbine blade into rotation. In hydraulic pitch systems, hydraulic pistons may move the blades.

The pitch bearing is generally subjected to high loads and oscillations. This may lead to wear and damage of the bearing rings and/or the roller elements between them if a lubricant is not homogeneously distributed in the pitch bearing. Grease lubricants are generally used. The lubricant needs to be well distributed and reach all the relevant portions and elements of the bearing. Pitching the blades may be required to promote a homogeneous distribution of the lubricant, especially if the pitch angle of the blade has not changed during a long period of time or if the pitch angle varies in a small amount, e.g. less than 1° (degree), many times.

Below the nominal wind speed, e.g. between 11 and 13 m/s, the generated power is below the nominal (i.e. rated, maximum) power, and a pitch angle is generally maintained at a same, or around a, default position, typically at 0° or close to 0°. As the pitch angle can be constant may vary in small amounts for a prolonged period of time when operating at below the nominal wind speed or such that the movement may be insufficient to distribute the lubricant, it may be necessary to pitch the blades for specifically distributing the lubricant. For example, the main controller of the wind turbine may be configured to indicate that the blades are pitched X° every Y hours.

Above the nominal wind speed, the generated power is the nominal power (usually until the cut-out wind speed is reached) and the pitch angle of the blades is generally varied for controlling the loads acting on the blades and the wind turbine. As the blades are pitched frequently or continuously, the lubricant lubricating the pitch bearing tends to be well distributed in this regime. If it is determined that the lubricant is not sufficiently well distributed, the blades may be pitched for specifically redistributing the lubricant in this regime in some examples.

The speed at which pitching is performed is relevant. If pitching for lubricating the pitch bearing is performed too quickly, the loads acting on the blades may be too high. But if pitching for lubricating the pitch bearing is performed relatively slowly, power generation may be reduced significantly.

The present disclosure aims at optimizing a balance between loads acting on the blades and energy production during pitching for lubricating the pitch bearings.

SUMMARY

In an aspect of the present disclosure, a method for lubricating a pitch bearing connecting a blade and a hub of a wind turbine is provided. The method comprises determining that lubricating a pitch bearing is to be carried out. The method further comprises determining a top limit for a load gradient, the load gradient being a derivative of the load with respect to time. The method further comprises determining a pitch rate for lubricating the pitch bearing based at least partially on the top limit for the load gradient. The method further comprises pitching the wind turbine blade at the determined pitch rate for lubricating the pitch bearing such that the top limit for the load gradient is not exceeded.

According to this aspect, a top limit for the load gradient is determined, and a pitch rate is determined based at least partially on the determined top limit. In this manner, pitching for lubricating the pitch bearing, e.g. for distributing a lubricant along an interface between an inner ring and an outer ring of the pitch bearing, may be performed as fast as possible without subjecting the wind turbine blades to higher than acceptable loads. Unnecessary loss of power production may be avoided, while fatigue loads can be maintained at an acceptable level.

In a further aspect of the present disclosure, a wind turbine controller is provided. The wind turbine controller comprises a processor and a memory. The memory comprises instructions that, when executed by the processor, cause the processor to determine that lubricating a pitch bearing is necessary, to determine a top limit for a load gradient, the load gradient being a derivative of thrust with respect to time, and to determine a pitch rate for lubricating the pitch bearing connecting a blade and a hub of a wind turbine based on the top limit for the load gradient such that the top limit for the load gradient is not exceeded while pitching.

In a further aspect of the present disclosure, a wind turbine is provided. The wind turbine comprises a tower, a nacelle on top of the tower and a rotor connected to the nacelle. The rotor comprises a hub and a plurality of blades connected to the hub through pitch bearings. The wind turbine further comprises the wind turbine controller of the previous aspect.

In a further aspect of the present disclosure, a method is provided. The method comprises determining that a pitch bearing connecting a blade and a hub of a wind turbine requires lubrication, determining a prevailing wind speed, determining a variation of thrust with respect to pitch angle based on the prevailing wind speed, determining a pitch rate for lubricating the pitch bearing based on the variation of thrust with respect to pitch angle and a maximum limit for a thrust gradient, the thrust gradient being a derivative of thrust with respect to time, and pitching the wind turbine blade at the determined pitch rate for lubricating the pitch bearing such that the maximum limit for the thrust gradient is not exceeded.

Aerodynamic thrust on the rotor of the wind turbine is a load that is indicative of fatigue loads on the wind turbine. According to this aspect, a thrust gradient is kept below an acceptable limit to optimize annual energy yield while maintaining fatigue loads at an acceptable level.

DETAILED DESCRIPTION OF EXAMPLES

Figure 1:
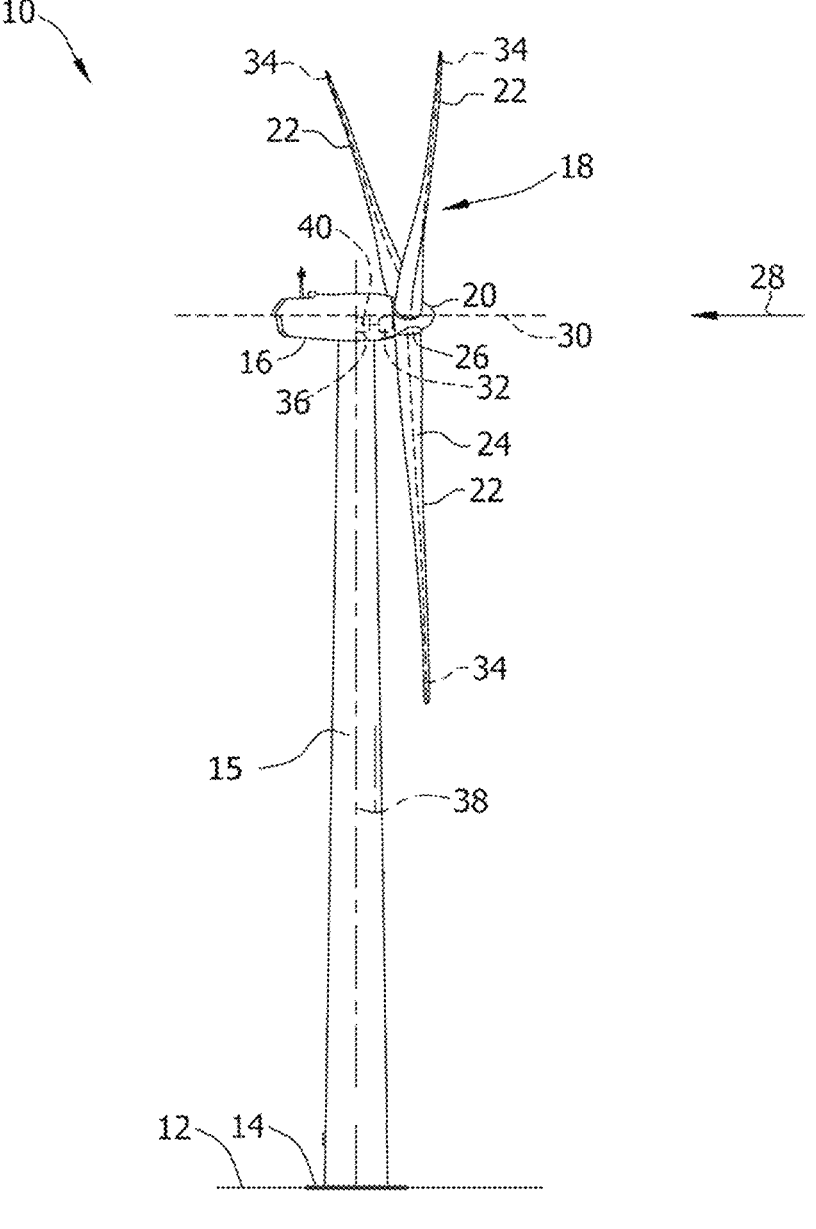
FIG. 1 illustrates a perspective view of one example of a wind turbine.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, e.g. an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed control system throughout the wind turbine 10, on the support system 14, within a wind farm, and/or at a remote-control center. The wind turbine controller 36 may include one or more processors configured to perform one or more of the steps of the methods described herein. Further, many of the other components described herein include one or more processors. The wind turbine controller 36 may also include a memory, e.g. one or more memory devices. As used herein, a memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements.

Figure 2:
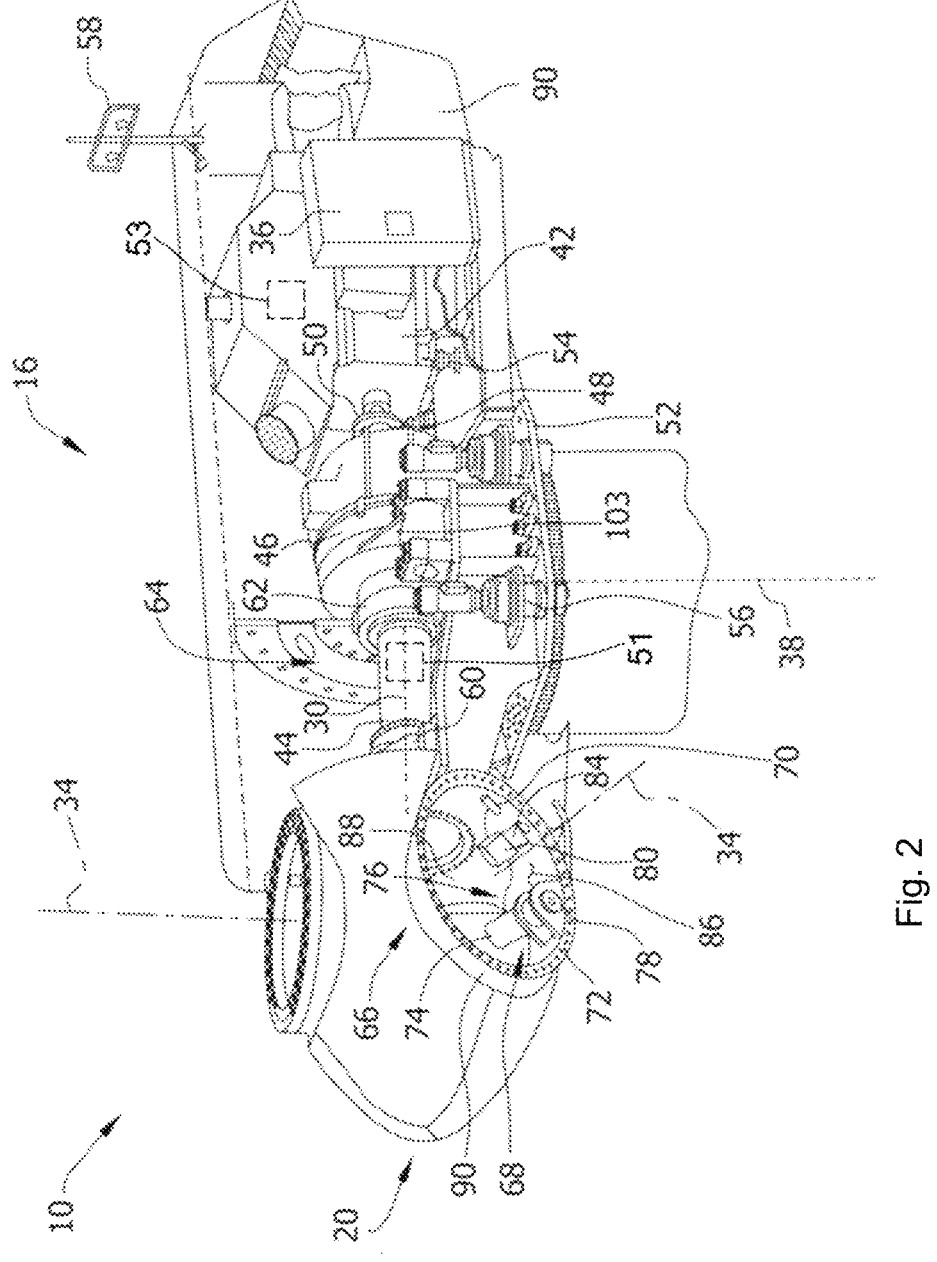
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (e.g. 10-35 kV). Offshore wind turbines may have for example generator voltages between 650 V and 3500 V, and transformer voltages may for instance be between 30 kV and 70 kV. Said electrical energy is conducted via power cables from the nacelle 16 into the tower 15.

In some examples, the wind turbine 10 may include one or more shaft sensors 51. The shaft sensors may be configured to monitor at least one of torque loads acting on the main shaft 44 and/or the high-speed shaft 48, and a rotational speed of the shaft 44, 48. In some examples, the wind turbine 10 may include one or more generator sensors 53. The generator sensors may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs).

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operates at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and an anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electric power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system

68 to provide a source of power to these components. In the example, the power generator 84 provides a continuing source of power to the pitch assembly 66 during operation of the wind turbine 10. In an alternative embodiment, power source 84 provides power to the pitch assembly 66 only during an electric power loss event of the wind turbine 10. The electric power loss event may include power grid loss or dip, malfunctioning of an electrical system of the wind turbine 10, and/or failure of the wind turbine controller 36. During the electric power loss event, the power generator 84 operates to provide electric power to the pitch assembly 66 such that pitch assembly 66 can operate during the electric power loss event.

In the example, the pitch drive system 68, the sensor 70, the pitch control system 80, cables, and the power source 84 are each positioned in a cavity 86 defined by an inner surface 88 of hub 20. In an alternative embodiment, said components are positioned with respect to an outer surface of hub 20 and may be coupled, directly or indirectly, to the outer surface.

As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein.

Figure 3:
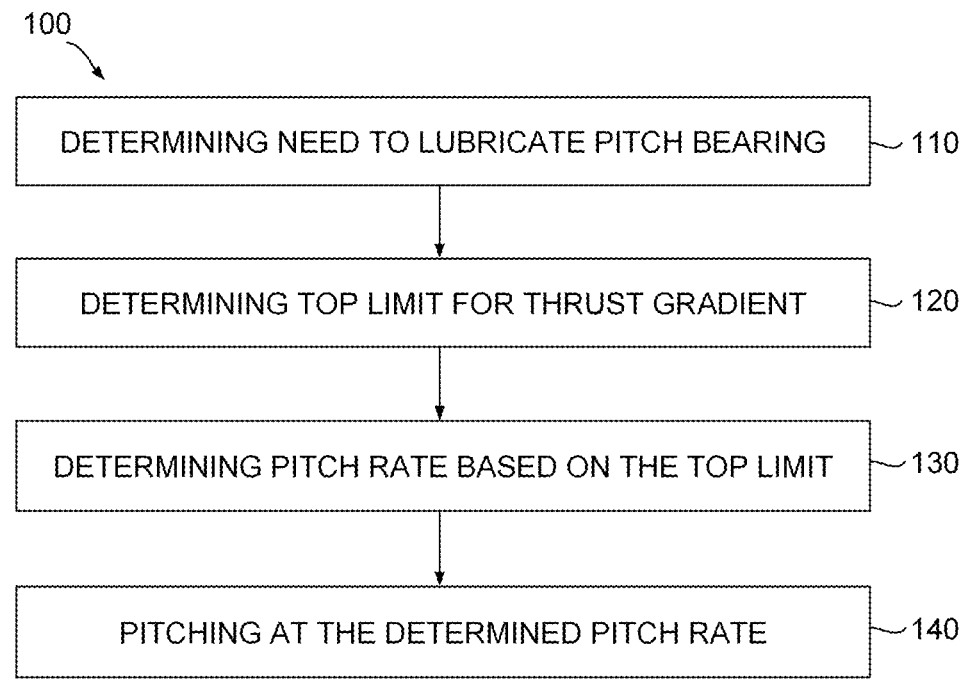
FIG. 3 shows a flow chart of an example of a method for lubricating a pitch bearing connecting a blade and a hub of a wind turbine.

In an aspect of the present disclosure, a method 100 for lubricating a pitch bearing 72 connecting a blade 22 and a hub 20 of a wind turbine 10 is provided. Method 100 is schematically shown in the flow chart of FIG. 3. The method comprises, at block 110, determining that lubricating the pitch bearing is to be carried out. The method further comprises, at block 120, determining a top limit for a load gradient, the load gradient being a derivative of the load with respect to time. In this specific example, the load gradient is a thrust gradient i.e. a variation of aerodynamic thrust with respect to time.

The method further comprises, at block 130, determining a pitch rate for lubricating the pitch bearing 72 based at least partially on the top limit for the load gradient. The method further comprises, at block 140, pitching the wind turbine blade 22 at the determined pitch rate for lubricating the pitch bearing 72 such that the top limit for the load gradient is not exceeded.

In this manner, a maximum variation of the load with time may be determined and used as a top limit, and a pitch rate may be determined to avoid exceeding the top limit. Distributing the lubricant in the pitch bearing by pitching the wind turbine blade may therefore be performed as quickly as possible, thus reducing potential power loss, while controlling the loads on the blades of the wind turbine.

Determining the top limit for the load gradient may comprise looking into a data structure, e.g. into a look-up table, or receiving the top limit from another controller, element or system, and others. The top limit may be predefined and e.g. stored in a data structure, such that determining the top limit comprises accessing the data structure. A suitable value for the top limit may for example be based on the dimensions of the wind turbine blades or the location of the wind turbine, as this may influence the loads exerted on the wind turbine.

In some examples, the top limit may be calculated. For example, the wind turbine controller may determine a first top limit, and then determine the actual top limit as a percentage of the first top limit. Fatigue, damage and other parameters experienced by the wind turbine blades may influence the percentage applied. The top limit for the load gradient may vary during a lifetime of the wind turbine in some examples.

The order of steps as illustrated in this figure is not to be regarded as limiting. E.g. the step of determining 110 that lubricating the pitch bearing 72 is to be carried out (i.e. deemed beneficial or necessary) may be performed before the determination of the pitch rate at block 130, and in some examples also before the step of determining the top limit for the thrust gradient at block 120. The step of determining the top limit at block 120 may be performed before the step at block 110 in other examples.

Determining that lubricating the pitch bearing is to be carried out may be performed in several manners. In some examples, determining that lubricating the pitch bearing is necessary (or beneficial) may comprise determining that the pitch bearing 72 has not been lubricated during a (first) predefined period of time. In some of these examples, the method may comprise determining that a (first) predefined period of time has elapsed. For instance, a frequency of pitching the blades 22 for lubricating the pitch bearing rings may be predefined. The controller 36 may be configured to periodically lubricate the pitch bearing ring in some examples. A memory of the wind turbine controller may include a stored instruction which indicates that a blade 22 of the wind turbine may be pitched X° every Y hours. In such a case, the times at which the pitch bearing 72 is lubricated are predefined. Therefore, if a certain predefined time period has elapsed, the pitch rate for lubricating the pitch bearing 72 may be determined. I.e., after Y hours, the blade may be pitched X° at the determined pitch rate. And after another Y hours, the blade may be pitched X° again at a same or a different pitch rate. Pitching X° may e.g. take tens of seconds or a few minutes.

Determining that lubricating the pitch bearing is to be carried out may comprise determining that the pitch bearing 72 has not been lubricated during a second predefined period of time different from the first predefined period of time. For example, the method may further comprise determining that a second predefined period of time has elapsed. The wind turbine controller 36 may be configured to start lubrication of the pitch bearing after a certain first time period and after another certain second time period. For example, the wind turbine controller may be configured to pitch a blade X° every Y hours as well as to pitch the same blade W° every Z hours, wherein X is different from W and Y is different from Z. For instance, the blade may be pitched a small number of degrees at short time intervals and the blade may also be pitched a big or bigger number of degrees at long or longer time intervals.

Determining that lubricating the pitch bearing is to be carried out may comprise determining that the blade 22 has not been rotated a predefined amount during a predefined period of time. e.g. determining that the blade 22 has not been rotated, at all or above a threshold, during a (first) predefined period of time. If a blade 22 should be pitched X° every Y hours (e.g. X° in a same direction), but this has not been achieved, the pitch rate for lubricating the pitch bearing 72 may then be determined.

Additionally or alternatively, the wind turbine 10 may include one or more sensors which may be used for obtaining information related to the lubrication of the pitch bearing 72 and checking whether pitching for lubricating the pitch bearing is necessary. For example, if it is detected that lubricating the pitch bearing 72 is necessary before a predefined time period has expired, the pitch rate may be determined, without waiting for the predefined time period to elapse.

Determining that lubricating the pitch bearing is to be carried out may comprise determining that a prevailing wind speed is below a nominal wind speed. As for wind speeds above the nominal wind speed, the blades 22 of the wind turbine 10 may be pitched frequently, redistributing a lubricant between an outer bearing ring and an inner bearing ring of the pitch bearing 72 may not be necessary. Therefore, in some examples a pitch rate may only be determined 130 if a prevailing wind speed is below the nominal (i.e. rated) wind speed. The wind turbine controller may be configured to have a first operation or control mode for wind speeds below the nominal wind speed in which the pitch rate may be determined 130, and a second operation or control mode (different from the first mode) for wind speeds above the nominal wind speed in which a pitch rate is not determined 130.

The pitch rate may be determined at block 130 based on prevailing wind conditions, specifically a prevailing wind speed. Determining a prevailing wind speed may comprise measuring or estimating a prevailing wind speed. A wind speed may be determined (immediately) after detecting that lubricating the pitch bearing is necessary. Therefore, in some examples it may be detected that lubricating the pitch bearing is required, a prevailing wind speed may then for example be measured, and a suitable pitch rate may be determined. Wind speed may be determined based on rotor speed, pitch angle, etc. in some examples. An anemometer or LIDAR may be used to determine a prevailing wind speed in other examples. Other wind conditions that may be taken into account include a level of turbulence, e.g. turbulence intensity. Further wind conditions that may be taken into account can include a wind direction (variation), wind shear, and wind veer.

Data of loads as a function of pitch angle and as a function of wind speed may be known in advance. For example, data as e.g. shown in FIG. 4 may be predefined. In the following example, aerodynamic thrust will be used as an example for the loads. In other examples, other loads may be used, e.g. tower or blade bending loads.

Figure 4:
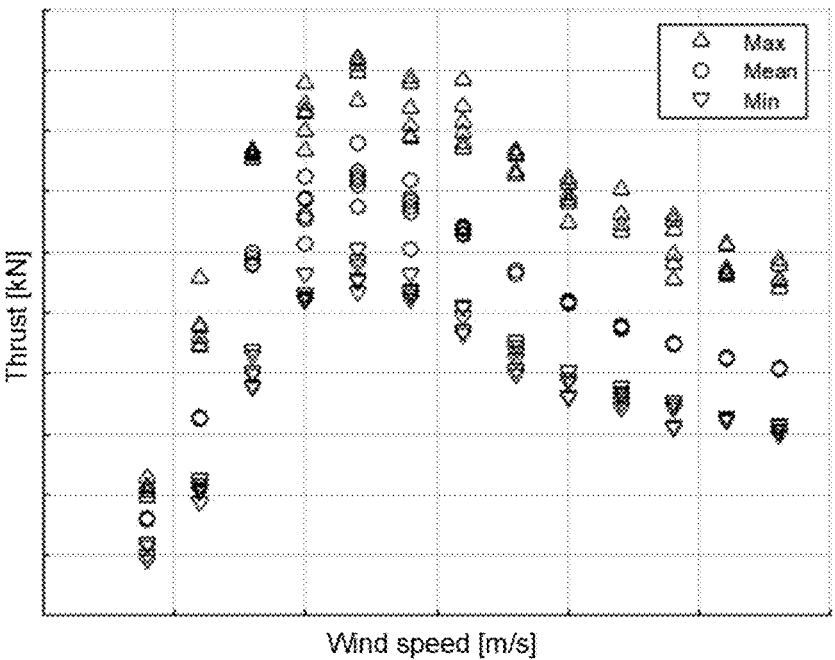
FIG. 4 shows an example of a simulation of thrust as a function of wind speed.

FIG. 4 shows an example of a simulation of thrust, in kN (kilo newtons), as a function of wind speed, in m/s (meters per second). Minimum, maximum and average values for the thrust for a given wind speed can be seen in this figure. In some examples, a thrust gradient may be regarded as dependent on more than only the wind speed, e.g. also dependent on turbulence. Turbulence can cause the thrust to have different values for a same average wind speed. For example, a certain wind profile with a specific average wind speed may be introduced. As the instantaneous wind speed is not constant during all the simulation, dispersion in the thrust values is introduced.

In the example of FIG. 4, the rotor 18 of the wind turbine 10 is assumed to be facing the wind for all wind speeds. A dispersion in the direction of the incident wind may also be introduced in the simulation, such that the values of thrust calculated also take into account that the direction of the incoming wind may not be constant during the simulation. As can be seen in FIG. 4, the thrust, i.e. the axial force applied by the wind on the rotor of the wind turbine, is maximum when the wind turbine is operating around the rated (nominal) wind speed.

Such a simulation may be performed in advance, i.e. before operating the wind turbine. The data thereof may be for example stored in a memory of a wind turbine controller, e.g. the main wind turbine controller 36, before the wind turbine is installed. In a further example, a remote operating center may have such data stored, or the SCADA system may have such data stored. During operation the wind turbine may have access to this information.

Figure 5:
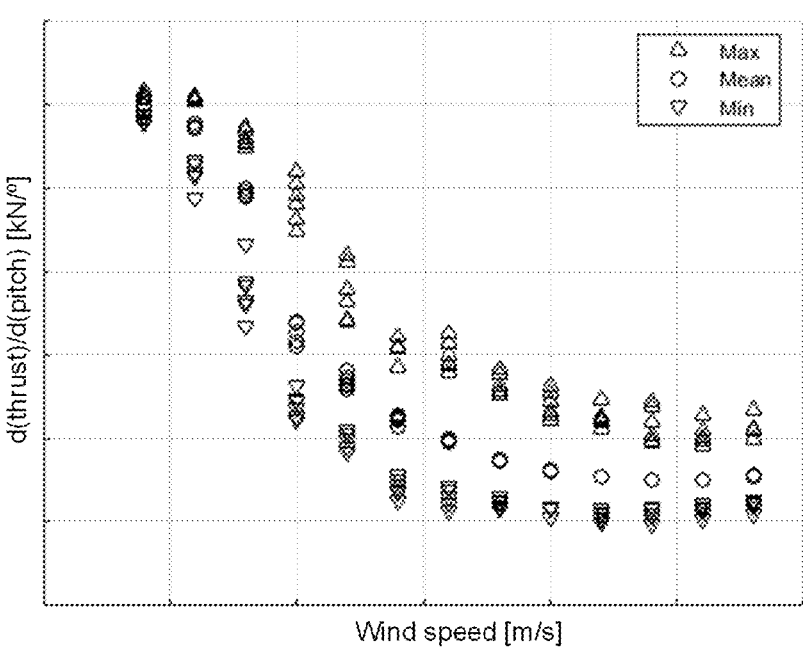
FIG. 5 shows an example of a simulation of thrust gradient as a function of wind speed.

FIG. 5 shows an example of a simulation of a variation of thrust with respect to pitch angle, in kN/°, as a function of wind speed, in m/s. In particular, FIG. 5 shows the pitch derivative of the thrust of the example of FIG. 4. FIG. 5 therefore shows maximum, minimum and average values of how much thrust would vary per degree of pitching at a certain wind speed.

In absolute values, the thrust gradient is generally lower at lower wind speeds. Therefore, the expected loads on the blades while pitching are lower at low wind speeds, and pitching may be performed faster. At higher wind speeds, the absolute value of the thrust gradient is generally higher. Therefore, the expected loads on the blades while pitching are higher at high wind speeds, and pitching may be performed slower for avoiding excessive loads on the blades.

In some examples, data of variation of thrust with respect to pitch angle as a function of wind speed may be known in advance. I.e., data such as the one shown in FIG. 5 may be predefined, e.g. because a simulation may have been performed in advance. Known mathematical models may be used for performing the simulation. Instead of or in addition to the data shown in FIG. 4, the data of FIG. 5 may be stored in a memory of a wind turbine controller, e.g. the main wind turbine controller 36, before the installation of the wind turbine. Similarly as before, such data may be stored in a SCADA system or at a remote location, e.g. a remote operating center.

During operation, the wind turbine may have access to this information. The predefined data (e.g. thrust or variation of thrust with respect to pitch angle as a function of wind speed) may be stored in any suitable manner. In some examples, a look-up table may be used.

Mathematical equations and mathematical models known in the art to determine, e.g. calculate or simulate, a thrust or variation of thrust with respect to pitch angle as a function of wind speed may be used to derive the aforementioned data.

Therefore, when it is determined that the distribution of the lubricant in the pitch bearing is to be redistributed, prevailing wind conditions may be determined e.g. measured, and the (predefined) data of variation of thrust (or other loads) with respect to pitch angle for those wind conditions may be used to determine a variation of thrust with respect to pitch angle for the prevailing wind speed. In some cases, the wind conditions may simply refer to wind speed, and in other cases, the wind conditions may be more sophisticated including one or more of: air density, wind direction, wind veer, wind shear, turbulence, temperature or others.

The top limit for the thrust gradient, e.g. in kN/s, may be divided by the determined value of variation of thrust with respect to pitch angle, in e.g. kN/°, obtaining a value for the pitch rate, e.g. in °/s.

In some examples, an average value of variation of thrust with respect to pitch for a determined, e.g. measured, prevailing wind speed may be used for determining the pitch rate at block 130.

Determining the pitch rate may be performed in several manners. In some examples, determining the pitch rate may comprise using predefined data of thrust and variation of thrust with respect to pitch angle. For example, a look-up table or any other suitable data structure may be consulted by the wind turbine controller 36 to determine a value of variation of thrust with respect to pitch angle. In other examples, the data of thrust and the data of variation of thrust with respect to pitch angle may not be predefined, and it may be calculated or estimated each time such information may be useful or necessary. Suitable mathematical equations may be used to this end.

In some examples, the determined pitch rate may be maximum for the previously determined top limit for the thrust gradient at block 120. I.e., the highest possible pitch rate may be determined for the thrust limit. In this manner, pitching may be performed as fast as possible but without exceeding the thrust limit previously determined.

In other examples, the determined pitch rate does not need to be maximum for the thrust gradient limit. For instance, a pitch rate which is not the fastest possible pitch rate for the thrust limit set may be determined.

In some examples, the determined pitch rate may be above a bottom limit for the pitch rate. The bottom limit for the pitch rate may be predefined, i.e. known in advance, such that the determined pitch rate is sufficiently high. For example, a predefined bottom limit for the pitch rate may be provided for different wind speeds, e.g. for different average wind speeds. The bottom limit may be different for all of some of these wind speeds. The bottom limit may be the same for at least some of the wind speeds in some examples. One or more bottom limits for the pitch rate may be stored in a memory of the wind turbine controller 36.

In other examples, the bottom limit for the pitch rate may be implicit, in the sense that as a trade-off between maximizing power production and minimizing the loads on the wind turbine during pitching may be achieved, the determined pitch rate may not fall below a certain value. Very low or excessively low pitch rates may be excluded.

The determined pitch rate may be maintained during a complete pitching maneuver for lubricating the pitch bearing. Pitching for lubricating the pitch bearing generally requires only a small amount of time, e.g. less than 5 minutes, even less than 2 minutes, keeping the determined pitch rate may provide an effective and safe lubricating maneuver of the pitch bearing. A lubrication maneuver may comprise one or more than one lubrication strokes. A lubrication stroke may include pitching in a first direction and then pitching back in the opposite direction.

In other examples, the method may further comprise varying the pitch rate during the lubrication of the pitch bearing. This option may be implemented depending e.g. on the expected duration of the pitching maneuver for lubricating the pitch bearing or if wind gusts or other significant changes in wind conditions are expected or experienced.

The method may be applied to all the blades 22 of the wind turbine 10 at a same time, e.g. all the blades 22 may be pitched for lubricating the corresponding pitch bearing at a same time in some examples. The duration of the lubrication maneuver and the determined pitch rate may also be the same for all the blades of the wind turbine.

According to a further aspect of the disclosure, a wind turbine controller 36 is provided. The wind turbine controller comprises a processor and a memory. The memory comprises instructions that, when executed by the processor cause the processor to: determine a top limit for a load gradient, the load gradient being a derivative of thrust with respect to time, to determine a pitch rate for lubricating a pitch bearing connecting a blade and a hub of a wind turbine based on the top limit for the load gradient, and pitching the wind turbine blade at the determined pitch rate for lubricating the pitch bearing such that the top limit for the load gradient is not exceeded.

The memory may generally be configured to store suitable computer-readable instructions that, when implemented by the processor, configure the wind turbine controller 36 to perform, or trigger the performance of, various steps disclosed herein, e.g. with respect to method 100, as appropriate. The memory may also be configured to store data, e.g. predefined data or data from measurements and/or calculations.

The wind turbine controller 36 may further comprise a communications module. The communications module may facilitate communications between the controller 36 and the various components of the wind turbine 10. For instance, the communications module may serve as an interface to enable the turbine controller 36 to transmit control signals to a pitch drive system 66 for controlling the pitch angle of the rotor blades 22. The communications module may be configured to communicatively connect the controller 36 with other elements of the wind turbine 10. Connecting may be carried out via a wired connection and/or via a wireless connection, e.g. by using any suitable wireless communications protocol known in the art. Moreover, the communications module may include a sensor interface, e.g. one or more analog-to-digital converters, to enable signals transmitted from one or more sensors (e.g. a wind speed sensor) to be converted into signals that can be understood and processed by the processor.

The controller 36 may be configured to perform one or more of the steps and actions referred to in method 100 (and also referred to in method 200 below).

According to a further aspect of the disclosure, a wind turbine 10 is provided. The wind turbine comprises a tower 15, a nacelle 16 on top of the tower 15, a rotor 18 connected to the nacelle 16, the rotor comprising a hub 20 and a plurality of blades 22 connected to the hub through pitch bearings, the wind turbine further comprising the wind turbine controller 36 of the previous aspect.

In some examples, the wind turbine may be an offshore wind turbine. The generation of electric power of an offshore wind turbine may not be stopped for performing a lubrication maneuver, and therefore the above method may be particularly beneficial for a offshore wind turbine. Although the above method may of course be performed by an onshore wind turbine.

Figure 6:
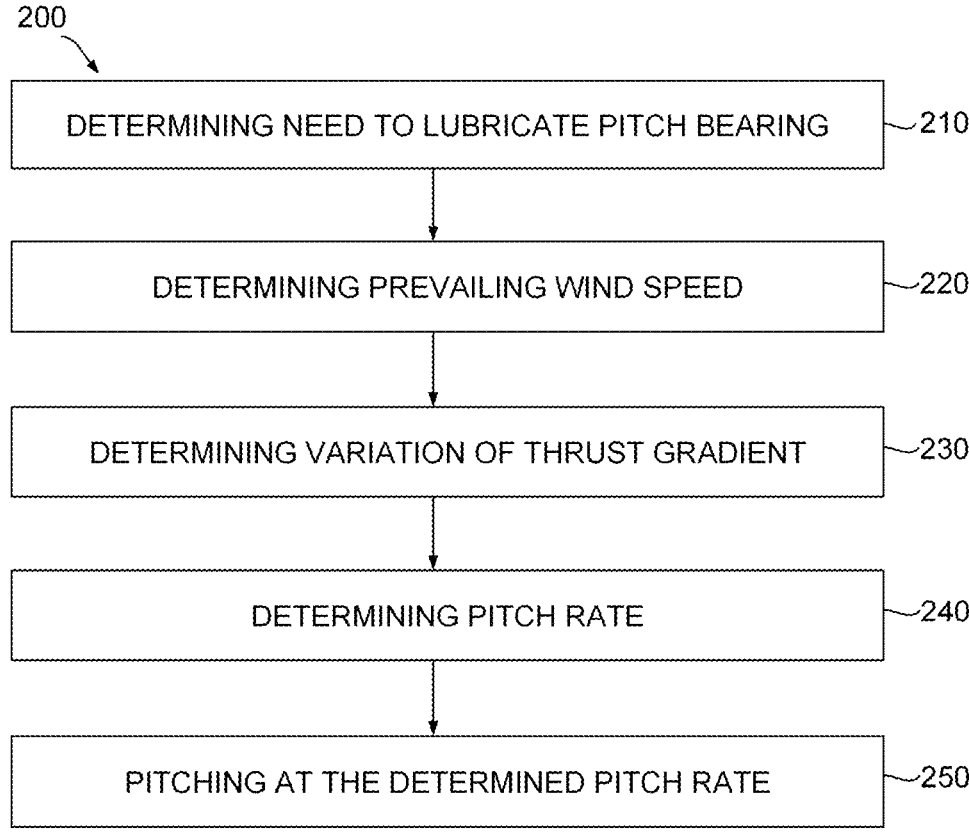
FIG. 6 shows a flow chart of another example of a method for lubricating a pitch bearing.

According to a further aspect of the disclosure, a method 200 is provided. Method 200 is shown in the flow chart of FIG. 6. Details and explanations of the previous aspects, e.g. of method 100, may be combined and applied to this aspect, and vice versa.

The method comprises: at block 210, determining that a pitch bearing 72 connecting a blade 22 and a hub 20 of a wind turbine 10 requires lubrication; at block 220, determining a prevailing wind speed; at block 230, determining a variation of thrust with respect to pitch angle based on the prevailing wind speed; at block 240, determining a pitch rate for lubricating the pitch bearing 72 based on the variation of thrust with respect to pitch angle and a maximum limit for a thrust gradient, the thrust gradient being a derivative of thrust with respect to time; and at block 250, pitching the wind turbine blade 22 at the determined pitch rate for lubricating the pitch bearing such that the maximum limit for the thrust gradient is not overcome.

Determining that the pitch bearing 72 requires to be lubricated may comprise determining that the pitch bearing 72 has not been lubricated during a predefined period of time.

The pitch rate may be kept constant until the lubrication of the pitch bearing is ended. Determining the pitch rate may comprise dividing the maximum limit for thrust gradient by the variation of thrust with respect to pitch angle. In some examples, an additional safety or loads factor may be taken into account.

Data of thrust and data of variation of thrust with respect to pitch angle as a function of wind speed may be predefined as hereinbefore explained.

This written description uses examples to disclose a teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for lubricating a pitch bearing connecting a wind turbine blade and a hub of a wind turbine, the wind turbine including a tower, the method comprising:
   determining that lubricating the pitch bearing is to be carried out;
   determining a top limit for a load gradient, the load gradient being a derivative of a load acting on the wind turbine blade or the tower with respect to time;
   determining a pitch rate for lubricating the pitch bearing based on the top limit for the load gradient; and
   pitching the wind turbine blade at the determined pitch rate for lubricating the pitch bearing such that the top limit for the load gradient is not exceeded.

2. The method of claim 1, wherein the top limit for the load gradient is predefined.

3. The method of claim 1, wherein the pitch rate is determined based on prevailing wind conditions.

4. The method of claim 3, wherein the prevailing wind conditions comprise, at least, turbulence intensity.

5. The method of claim 3, wherein determining the pitch rate comprises determining a variation of the load with respect to a pitch angle for the prevailing wind conditions.

6. The method of claim 5, wherein determining the pitch rate further comprises dividing the top limit for the load gradient by the determined variation of the load with respect to the pitch angle for the prevailing wind conditions.

7. The method of claim 5, wherein data of the load as a function of the pitch angle and as a function of the prevailing wind conditions is predefined.

8. The method of claim 1, wherein the load is aerodynamic thrust on a rotor of the wind turbine.

9. The method of claim 1, wherein determining that lubricating the pitch bearing is to be carried out comprises determining that the wind turbine blade has been rotated less than a predetermined amount during a predefined period of time.

10. The method of claim 1, wherein determining that lubricating the pitch bearing is to carried out comprises determining that a prevailing wind speed is below a nominal wind speed.

11. The method of claim 1, further comprising maintaining the determined pitch rate constant during a complete pitching maneuver for lubricating the pitch bearing.

12. The method of claim 1, wherein the pitch bearing is lubricated in less than five minutes.

13. A wind turbine, comprising:
   a blade;
   a hub, the blade mounted to the hub via a pitch bearing;
   a tower;
   a controller comprising a processor and a memory, the controller configured to perform the following:
      determine that lubricating the pitch bearing is to be carried out;
      determine a top limit for a load gradient, the load gradient being a derivative of a load acting on the blade or the tower with respect to time;
      determine a pitch rate for lubricating the pitch bearing based on the top limit for the load gradient; and
      pitch the blade at the determined pitch rate for lubricating the pitch bearing such that the top limit for the load gradient is not exceeded.

14. The wind turbine of claim 13, wherein the controller is further configured to determine a prevailing wind speed and to determine a variation of the load with respect to a pitch angle for the determined prevailing wind speed.

15. The wind turbine of claim 13, wherein the controller is further configured to determine the pitch rate by dividing the top limit for the load gradient by the variation of the load with respect to a pitch angle.

16. A method, comprising:
   determining that a pitch bearing connecting a blade and a hub of a wind turbine requires lubrication;
   determining a prevailing wind speed;
   determining a variation of thrust with respect to a pitch angle based at least partially on the prevailing wind speed;
   determining a pitch rate for lubricating the pitch bearing based on the variation of thrust with respect to the pitch angle and a maximum limit for a thrust gradient, the thrust gradient being a derivative of thrust with respect to time; and
   pitching the blade at the determined pitch rate for lubricating the pitch bearing such that the maximum limit for the thrust gradient is not exceeded.

17. The method of claim 16, wherein determining that the pitch bearing requires lubrication comprises determining that the pitch bearing has not been pitched during a predefined period of time.

18. The method of claim 16, wherein the pitch rate is kept constant until lubrication of the pitch bearing has ended.

19. The method of claim 16, wherein determining the pitch rate comprises dividing the maximum limit for the thrust gradient by the variation of thrust with respect to the pitch angle.

20. The method of claim 16, wherein data of the variation of thrust with respect to the pitch angle as a function of the prevailing wind speed.

* * * * *